United States Patent
Whinnett et al.

(10) Patent No.: US 7,428,416 B2
(45) Date of Patent: Sep. 23, 2008

(54) HANDOVER IN A CELLULAR COMMUNICATION SYSTEM

(75) Inventors: Nick W. Whinnett, Marlborough (GB); Amitava Ghosh, Buffalo Grove, IL (US); Weimin Xiao, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 25 days.

(21) Appl. No.: 11/288,842

(22) Filed: Nov. 29, 2005

(65) Prior Publication Data

US 2007/0123267 A1 May 31, 2007

(51) Int. Cl.
*H04Q 7/20* (2006.01)
(52) U.S. Cl. .................. 455/436; 455/437; 455/439; 455/442; 455/452.2; 370/331
(58) Field of Classification Search .......... 455/436, 455/437, 439, 442, 452.2; 370/331
See application file for complete search history.

(56) References Cited

U.S. PATENT DOCUMENTS

| | | | |
|---|---|---|---|
| 6,075,989 A * | 6/2000 | Moore et al. | 455/436 |
| 6,321,090 B1 * | 11/2001 | Soliman | 455/440 |
| 6,430,168 B1 * | 8/2002 | Djurkovic et al. | 370/331 |
| 6,466,556 B1 * | 10/2002 | Boudreaux | 370/331 |
| 6,590,879 B1 * | 7/2003 | Huang et al. | 370/331 |
| 6,947,399 B1 * | 9/2005 | Sen et al. | 370/331 |
| 7,020,491 B2 * | 3/2006 | Kobayashi | 455/561 |
| 2003/0054824 A1 * | 3/2003 | Choi et al. | 455/436 |
| 2003/0224730 A1 * | 12/2003 | Muszynski et al. | 455/62 |
| 2004/0266442 A1 * | 12/2004 | Flanagan et al. | 455/445 |
| 2005/0105488 A1 | 5/2005 | Raji et al. | |
| 2005/0143072 A1 * | 6/2005 | Yoon et al. | 455/436 |
| 2006/0073828 A1 * | 4/2006 | Sipila | 455/436 |
| 2007/0002798 A1 * | 1/2007 | Leung | 370/331 |

\* cited by examiner

*Primary Examiner*—Matthew Anderson
*Assistant Examiner*—Minh Dao

(57) ABSTRACT

A cellular communication system includes first and second base stations and a user equipment. A Radio Network Controller controls a handover of the user equipment between the base stations by either forwarding data of the communication to both the first and second base stations or to only one of the first and second base stations dependent on a Quality of Service (QoS) characteristic of the communication of the user equipment. The QoS characteristic can specifically be an indication of a delay constraint for the communication service such as an indication of whether the service is a real-time service or a non-real time service.

20 Claims, 3 Drawing Sheets

HANDOVER IN A CELLULAR COMMUNICATION SYSTEM

FIELD OF THE INVENTION

The invention relates to handover in a cellular communication system and in particular, but not exclusively, to handover by fast cell selection techniques.

BACKGROUND OF THE INVENTION

Currently, the most ubiquitous cellular communication system is the 2nd generation communication system known as the Global System for Mobile communication (GSM). Further description of the GSM TDMA communication system can be found in 'The GSM System for Mobile Communications' by Michel Mouly and Marie Bernadette Pautet, Bay Foreign Language Books, 1992, ISBN 2950719007.

To further enhance the services and performance of the GSM communication system, a number of enhancements and additions have been introduced to the GSM communication system over the years.

One such enhancement is the General Packet Radio System (GPRS), which is a system developed for enabling packet data based communication in a GSM communication system. Thus, the GPRS system is compatible with the GSM (voice) system and provides a number of additional services including provision of packet data communication, which augments and complements the circuit switched communication of a traditional communication system. Furthermore, the packet based data communication may also support packet based speech services. The GPRS system has been standardised as an add-on to an existing GSM communication system, and can be introduced to an existing GSM communication system by introducing new network elements. Specifically, a number of Serving GPRS Support Nodes (SGSN) and Gateway GPRS Support Nodes (GGSN) may be introduced to provide a packet based fixed network communication.

3rd generation systems are currently being rolled out to further enhance the communication services provided to mobile users. One such system is the Universal Mobile Telecommunication System (UMTS), which is currently being deployed. Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876. The core network of UMTS is built on the use of SGSNs and GGSNs thereby providing commonality with GPRS.

In order to further enhance the services and functionality that can be provided by cellular communication systems, standardisation work has already begun on improvements and enhancements for the 3$^{rd}$ Generation cellular communication systems. Specifically, a work item known as EUTRA (Enhanced UMTS Terrestrial Radio Access) is currently defined for investigating new cellular techniques for future enhancement of the UMTS Terrestrial Radio Air-interface.

3$^{rd}$ Generation cellular communication systems tend to use a technique called soft handover wherein simultaneous links are maintained between a user equipment and a plurality of base stations during a handover. However, for EUTRA, Fast Cell Selection (FCS) is preferred over soft handover for the downlink direction. Fast cell selection is a technique wherein the user equipment continuously monitors the quality of signals received from the serving base station and one or more neighbour base stations. The signals are used to evaluate which base station is currently the most suitable serving base station. The system incorporates a fast signaling mechanism which allows the user equipment to be quickly switched between base stations. Thus, in fast cell selection, the user equipment controls fast hard handovers between different base stations thereby allowing the communication to be supported by the most suitable base station.

In EUTRA, Orthogonal Frequency Domain Multiple Access (OFDMA) is one promising candidate for the downlink access technique. In contrast to CDMA systems, implementing soft handover for OFDMA is likely to require non-overlapping time and frequency allocations from the multiple base stations during the soft handover. However, this is wasteful in terms of the scarce radio resource and therefore fast cell selection promises to be a more suitable solution. Furthermore, for EUTRA fast scheduling of user equipments will be employed in the base station which does not lend itself to soft handover since it requires complex and impractical coordination between the scheduling performed by different base stations.

However, fast cell selection also has some associated problems and disadvantages. For example, signaling errors may occur which can result in the selected base station not receiving the cell reselection message resulting in the call being interrupted or dropped.

Furthermore, it is difficult to maintain the continuity of data when switching between the different cells without introducing complex algorithms and duplicated communication and storage of data at the involved base stations. However, this requires increased functionality, storage capacity and increased bandwidth of the communication links in the fixed network. Accordingly, disruptions can frequently occur when switching between cells and/or a significant delay can occur.

For example, for a system using a retransmission scheme, it is necessary to either wait for all data that has been forwarded to the previous serving base station (from for example the core network; a base station controller; or another base station) to be successfully acknowledged by the user equipment or it is necessary to forward duplicated data to the new base station. Thus, re-transmissions may be pending at the time of the cell change which must either be completed (adding latency) or aborted (resulting in waste of transmission resources). Accordingly, either an additional delay or increased bandwidth consumption results. Furthermore, in order to have an efficient switchover, the synchronization of the data buffers at the multiple base station is also required i.e. the newly selected base station needs to know which data has been successfully transmitted to the user equipment. This introduces additional complexity.

Hence, an improved system would be advantageous and in particular a system allowing increased flexibility, reduced delay, reduced bandwidth consumption, facilitated operation, reduced complexity and/or improved handover performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a cellular communication system comprising: at least a first base station and a second base station; at least a first user equipment; an apparatus for controlling a hard handover of the first user equipment between the first base station and the second base station, the apparatus comprising: means for determining a Quality of Service (QoS) characteristic for a communication of the first user equipment, and means for forwarding data of the communication arranged to forward the data to both the first base station and the second base station or to only one of the first base station and the second base station in response to the characteristic.

The invention may allow improved performance in a cellular communication system and may in particular allow improved handover performance. Performance and operation may be optimised for the specific requirements and preferences of the individual service provided to a first user equipment.

For example, delays may be reduced for services where this is particularly disadvantageous while allowing simple and efficient operation for other services. A more efficient use of radio resources may be achieved. In many scenarios, the invention may allow reduced communication between network elements of a fixed network of a cellular communication system.

In contrast to a soft handover, no simultaneous transmissions of the same data from different base stations occur for a hard handover. The system may specifically employ fast cell selection and the hard handover may be a fast cell selection handover.

The means for forwarding data may be arranged to forward data to both the first base station and the second base station for a first value of the QoS characteristic and to only one of the first base station and the second base station for a second value of the QoS characteristic.

The means for forwarding data may for example be located in the first base station and the data may thus be communicated from e.g. a Radio Network Controller to the first base station and then from there to the second base station.

According to an optional feature of the invention, the forwarding means is arranged to forward the data to both the first base station and the second base station if the QoS characteristic is indicative of the communication having a delay constraint meeting a criterion and to forward the data to only one of the first base station and the second base station if the QoS characteristic is indicative of the communication not having a delay constraint meeting the criterion.

This may allow improved performance in a cellular communication system. In particular it allows simple operation with low bandwidth requirements and reduced delays for delay sensitive services.

According to an optional feature of the invention, the forwarding means is arranged to forward the data to both the first base station and the second base station if the QoS characteristic is indicative of the communication supporting a real-time service and to forward the data to only one of the first base station and the second base station if the QoS characteristic is indicative of the communication supporting a non-real-time service.

This may allow improved performance in a cellular communication system. In particular it allows simple operation with low bandwidth requirements and reduced delays for real-time services.

According to an optional feature of the invention, the first and second base stations are arranged to operate in a shared data transmission mode during a handover interval if data is forwarded to both the first base station and the second base station, the shared data transmission mode comprising data packets being transmitted to the first user equipment from both the first and the second base station.

This may improve handover performance and in particular may provide reduced delay and/or facilitate operation. In the shared data transmission mode different data packets are transmitted from the first and the second base station.

According to an optional feature of the invention, the cellular communication system further comprises partitioning means for partitioning a total resource allocation for the communication between the first and second base station during the handover interval.

This may provide for facilitated operation and support of the shared data transmission mode without requiring additional resources to be allocated to the communication service. The resource allocation may for example be a time-frequency resource allocation, such as an allocation of a carrier frequency for a given time interval.

According to an optional feature of the invention, the partitioning means is arranged to modify the partitioning during the handover interval.

The partitioning may particularly be modified such that the partition allocated to the second base station is higher at the end of the handover interval than at the beginning of the handover interval. For example, the partitioning of resource may be such that resource is gradually transferred from the first base station to the second base station. The feature may allow improved handover performance.

According to an optional feature of the invention, the first and second base stations are arranged to transmit data to the first user equipment in orthogonal resource allocations during the handover interval.

This may facilitate operation and/or provide improved performance.

According to an optional feature of the invention, the orthogonal resource allocations are orthogonal in the time domain.

This may facilitate operation and/or provide improved performance.

According to an optional feature of the invention, the orthogonal resource allocations are orthogonal in the frequency domain.

This may facilitate operation and/or provide improved performance.

According to an optional feature of the invention, the communication is supported by a retransmission scheme and wherein during the handover interval the first base station is arranged to support retransmissions of data packets previously transmitted by the first base station.

This may facilitate operation and/or provide improved performance. Specifically, it may provide efficient retransmission performance while reducing the amount of data that needs to be forwarded or duplicated to the second base station.

Specifically, the first base station may re-transmit any data packets required by the retransmission whereas the initial transmissions of new data packets are made from the second base station.

According to an optional feature of the invention, the communication is supported by a retransmission scheme and wherein during the handover interval the second base station is arranged to transmit data packets not previously transmitted by the first base station.

This may facilitate operation and/or provide improved performance.

According to an optional feature of the invention, the second base station is arranged to receive an indication from the first user equipment of a data packet of the communication from which to start transmitting.

This may facilitate operation and/or provide improved performance.

According to an optional feature of the invention, the indication is received in retransmission feedback messages from the first user equipment to the first base station.

This may facilitate operation. This second base station may determine a suitable data packet from which to start transmitting by monitoring retransmission messages (e.g. ACK/NACK messages) from the first user equipment to the first base station.

According to an optional feature of the invention, the second base station is arranged to receive a transmission indication indicative of a number of data packets not successfully transmitted by the first base station at the end of the handover interval.

The indication may e.g. be received from the user equipment, from the first base station or from another network element of the fixed network. This may provide efficient and low complexity operation and performance.

According to an optional feature of the invention, the first user equipment comprises monitoring means for monitoring an operating characteristic during the handover interval; and error detection means for detecting an error in response to an inconsistency between the monitored operating characteristic and the shared data transmission mode.

This may allow improved performance and may in particular provide improved error performance. The feature allows early detection of handover errors and may therefore allow a more reliable handover performance. Specifically, the monitoring means can monitor if the first and/or second base station operates in accordance with the operating requirements and parameters of the shared data transmission mode and if not an error detection may be determined.

According to an optional feature of the invention, if the shared data is forwarded to only one of the first base station and the second base station, the data forwarding means is arranged to forward data to the first base station until a handover switch time and is arranged to forward data to the second base station after the handover switch time.

This may facilitate operation and/or provide improved performance.

According to an optional feature of the invention, the first base station is arranged to support a retransmission scheme for previously transmitted data packets after the handover switch time.

This may facilitate operation and/or provide improved performance. The handover switch time for the forwarding of data may be different than an air interface switch time wherein the air interface communication is switched from the first base station to the second base station. For example, the first base station may continue to retransmit data packets for an interval after the handover switch time. Thus, in this interval new data packets may be forwarded to the second base station rather than to the first base station while the air interface communication to the user equipment is still from the first base station in order to complete outstanding retransmissions.

According to an optional feature of the invention, the data forwarding means are arranged to determine the handover switch time in response to cell change signalling from the first user equipment.

This may facilitate operation and/or provide improved performance. The handover switch time may e.g. be determined from the time of reception of a cell change message from the user equipment or may be determined in response to an explicit time indication comprised in such a message.

According to an optional feature of the invention, the first base station comprises the apparatus for controlling the hard handover.

The means for forwarding may be arranged to forward the data internal in the first base station or may be able to forward it to the second base station. This may provide improved performance and suitable implementation in many embodiments.

According to another aspect of the invention, there is provided an apparatus for controlling a hard handover of a first user equipment between a first base station and a second base station, the apparatus comprising: means for determining a Quality of Service (QoS) characteristic for a communication of the first user equipment, and means for forwarding data of the communication to both the first base station and the second base station or to only one of the first base station and the second base station in response to the QoS characteristic.

According to another aspect of the invention, there is provided a method of controlling a hard handover of a first user equipment between a first base station and a second base station of a cellular communication system, the method comprising: determining a Quality of Service (QoS) characteristic for a communication of the first user equipment, and forwarding data of the communication to both the first base station and the second base station or to only one of the first base station and the second base station in response to the QoS characteristic.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to the current intentions for an EUTRA cellular communication system using a retransmission scheme. However, it will be appreciated that the invention is not limited to this application but may be applied to many other cellular communication systems.

Figure 1:
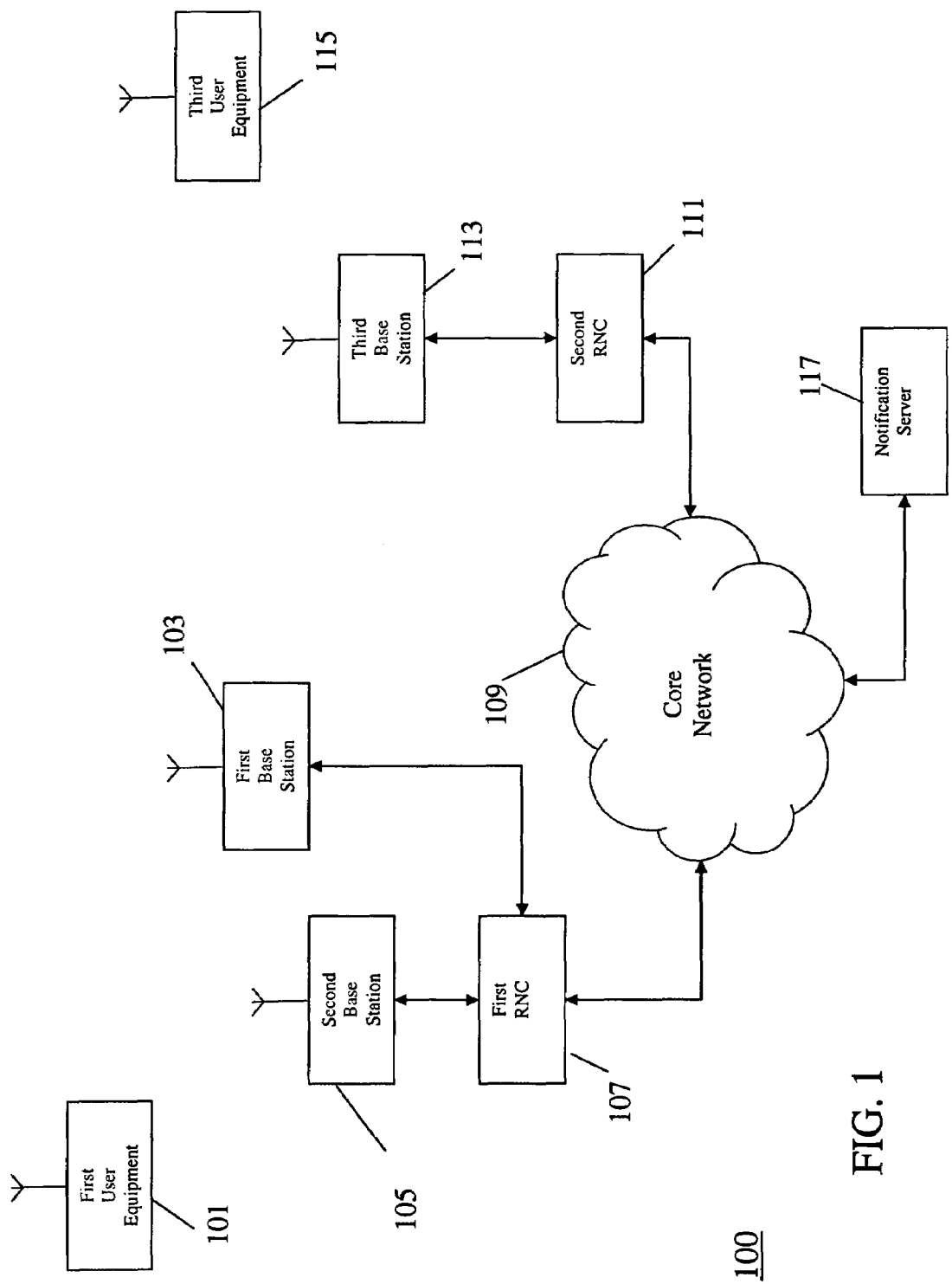
FIG. 1 is an illustration of a cellular communication system in accordance with some embodiments of the invention.

FIG. 1 illustrates an example of a cellular communication system 100 in which embodiments of the invention may be employed.

In a cellular communication system, a geographical region is divided into a number of cells each of which is served by a base station. The base stations are interconnected by a fixed network which can communicate data between the base stations. A user equipment (e.g. a 3$^{rd}$ Generation User Equipment (UE), a remote terminal, a mobile station etc) is served via a radio communication link by the base station of the cell within which the user equipment is situated.

As a user equipment moves, it may move from the coverage of one base station to the coverage of another, i.e. from one cell to another. As the user equipment moves towards a base station, it enters a region of overlapping coverage of two base stations and within this overlap region it changes to be supported by the new base station. As the user equipment moves further into the new cell, it continues to be supported by the new base station. This is known as a handover or handoff of a user equipment between cells.

A typical cellular communication system extends coverage over typically an entire country and comprises hundreds or even thousands of cells supporting thousands or even millions of user equipments. Communication from a user equipment to a base station is known as uplink, and communication from a base station to a user equipment is known as downlink.

In the example of FIG. 1, a first user equipment 101 is in a first cell supported by a first base station 103.

The first base station 103 is coupled to a first RNC 107 which is further coupled to a second base station 105 supporting a neighbour cell to the cell of the first base station 103. An RNC performs many of the control functions related to the air interface including radio resource management and routing of data to and from appropriate base stations.

The first RNC 107 is coupled to a core network 109. A core network interconnects RNCs and is operable to route data between any two RNCs, thereby enabling a user equipment in a cell to communicate with a user equipment in any other cell. In addition, a core network comprises gateway functions for interconnecting to external networks such as the Public Switched Telephone Network (PSTN), thereby allowing user equipments to communicate with landline telephones and other communication. terminals connected by a landline. Furthermore, the core network comprises much of the functionality required for managing a conventional cellular communication network including functionality for routing data, admission control, resource allocation, subscriber billing, user equipment authentication etc.

The core network 109 is further coupled to a second RNC 111 which is coupled to a third base station 113. The third base station 113 supports a third user equipment 115.

Alternatively the RNC functionality may be embedded within the base stations themselves.

In the specific example of FIG. 1, the first user equipment 101 is involved in an ongoing EUTRA call with the third user equipment 115. Initially the first user equipment 101 is supported by the first base station 103. The first user equipment 101 implements a fast cell selection algorithm and continually monitors signals received from the first base station 103 and the second base station 105. In the example, the first user equipment 101 is moving from the cell of first base station 103 towards the cell of the second base station 105. At some point, the fast cell selection criteria used by the first user equipment 101 determines that a hard handover should be made from the first base station 103 to the second base station 105.

It will be appreciated that fast cell selection techniques may introduce a certain ping-pong effect where the first user equipment 101 can execute handovers back and forth between the first and second base stations 103, 105 until the first user equipment 101 has moved sufficiently far into the cell of the second base station 105. Hysteresis may be employed to combat such ping-ponging as is known by those skilled in the art.

When the first user equipment 101 has determined that a hard handover from the first base station 103 to the second base station 105 is required, it transmits a cell switch message to the first and second base station 103, 105. In response, the first base station 103 and the second base station 105 enter into a handover operation mode in which the communication is gradually switched from the first base station 103 to the second base station 105.

In the system, the downlink traffic which is to be communicated to the first user equipment 101 is received by the first RNC 107 and is from there distributed to the first base station 103 and/or the second base station 105. The first RNC 107 will typically receive advance information from the first user equipment 101 that a handover from the first base station 103 to the second base station 105 may occur. In accordance with the system of FIG. 1, the first RNC 107 comprises functionality for entering a handover mode wherein downlink data for the first user equipment 101 is distributed to either only one of the first and second base station 103, 105 or to both the first and second base stations 103, 105 depending on the Quality of Service (QoS) characteristic of the downlink communication service.

Alternatively if RNC functionality is embedded within the BTSs then for example the first base station 103 may distribute the data to the second base station 105 depending on the Quality of Service (QoS) characteristic of the downlink communication service.

Figure 2:
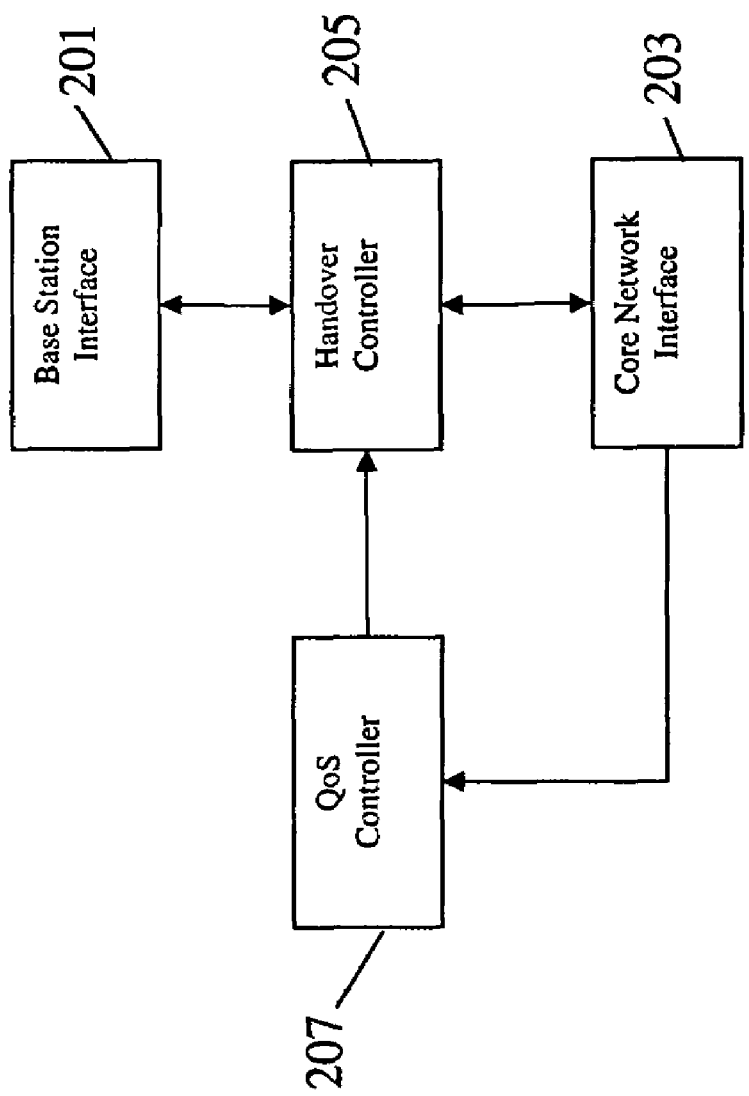
FIG. 2 illustrates an example of an apparatus for controlling a hard handover in accordance with some embodiments of the invention.

FIG. 2 illustrates an example of an apparatus 200 for controlling a hard handover in accordance with some embodiments of the invention. The apparatus can be implemented in the first RNC 107 and will be described with reference to this (alternatively it could be implemented in e.g. a BTS for example the first BTS 103).

The first RNC 107 comprises a base station interface 201 which interfaces to the first and second base station 103, 105 through suitable communication links as will be well known to the personal skilled in the art. Thus, the base station interface 201 is capable of transmitting and receiving data to/from the first base station 103 and the second base station 105.

The first RNC 107 furthermore comprises a core network interface 203 which is arranged interface to the core network 109. Specifically the core network interface 203 is capable of transmitting and receiving data to and from a network element of the core network, such as for example an (Serving GPRS Support Node).

The base station interface 201 and core network interface 203 are coupled to a handover controller 205 which is arranged to control the handover of user equipments served by the first RNC 107. Specifically, the handover controller 205 is arranged to control which base station downlink traffic is routed to for transmission to a given user equipment.

The first RNC 107 furthermore comprises a QoS controller 207 which is arranged to determine a Quality of Service (QoS) characteristic for a communication of the first user equipment 101.

The QoS characteristic can be any suitable QoS characteristic such as for example an indication of an allowable disruption, a call drop rate or an error rate. However, in the described embodiment the QoS characteristic is an indication of the dynamic requirements of the communication. In particular, the QoS characteristic can be an indication of an allowable delay for the transmission of data packets.

The indication can for example be an indication of whether the service supported is a real-time service or a non-real-time service. A real-time service can for example be a streaming media service or a packet data voice call (e.g. voice over IP) where even a relatively small delay or small disruptions are noticeable. In contrast, a non-real-time service can typically tolerate long disruptions or delays. For example an intranet browsing service will not be significantly degraded by even relatively large delays.

It will be appreciated that the QoS controller 207 can use any suitable algorithm or means for determining the QoS characteristic. Typically, in cellular communication systems a communication service is set up with a number of specified QoS parameters which the system must ensure are met. For example, a number of QoS characteristics may be predetermined and when setting up a new communication service a specific QoS category is selected for the service. In such embodiments, the QoS controller 207 can simply determine the QoS characteristic by determining which QoS category the service belongs or corresponds to.

In the described system, the handover controller 205 is coupled to the QoS controller 207 which is provided with the indication of which QoS category a given communication service about to be handed over belongs to. Thus, in the specific example, when the first user equipment 101 provides an indication that it enters a region wherein fast cell selection handovers can occur, the QoS controller 207 provides the handover controller 205 with an indication of the delay constraints of the communication service of the first user equipment 101. Specifically it can indicate whether the communication service is a real-time service or a non-real-time service.

In response, the handover controller 205 proceeds to enter one of two different handover modes of operation.

In the first mode of operation, which is entered for a delay non-sensitive service (e.g. a non-real-time service), the downlink data received from the core network for transmission to the first user equipment 101 is forwarded to either the first base station 103 or to the second base station 105.

Specifically, a handover switch time can be determined and the downlink data received before this time is forwarded to the first base station for transmission to the first user equipment and any data received after this is forwarded to the second base station 105 for transmission to the first user equipment 101. The handover switch time can be determined as a data packet number such that the handover controller 205 forwards a specified number of data packets to the first base station 103 after which it proceeds to forward the data to the second base station 105.

Thus, in this mode of operation data is only forwarded to one of the base stations and the buffer requirements and communication resources can be reduced as the need for duplication of data communication and storage can be obviated. Furthermore, although a handover can be delayed due to retransmissions from the first base station, this is unlikely to have significant effect on the perceived quality as the communication service is a delay insensitive service.

In the second handover mode of operation, which is entered for a delay sensitive service (e.g. a real-time service), the downlink data received from the core network for transmission to the first user equipment 101 is forwarded to both the first base station 103 and to the second base station 105. Thus, during a handover interval, the handover controller 205 forwards data packets to both base stations 103, 105 thereby allowing the downlink data to be transmitted from either of the base stations without the further involvement of the first RNC 107. In particular, the first and second base station 103, 105 may store the same data in their transmit buffers.

Accordingly, in this mode of operation a more flexible approach can be applied allowing the data to be transmitted from the most suitable base station without first requiring data to be communicated from one base station to the other. Furthermore, it allows an efficient retransmission performance as the data packets are available at both base stations and therefore can be retransmitted from the most suitable base station.

This approach provides particularly advantageous performance in a system using fast cell selection wherein the user equipment 101 selects the base station from which transmissions are to be received. In the second handover mode of operation, the base stations will during the handover interval already have the required downlink data stored in their buffers and the data can therefore be provided to the user equipment 101 from the selected base station without requiring any involvement from the first RNC 107 or requiring any more data to be communicated before this can be transmitted over the air interface to the first user equipment 101.

In a specific example, the second handover mode of operation is a shared data transmission mode wherein data packets are transmitted to the first user equipment from both the first and the second base station during the handover interval.

Thus, a short overlap period is implemented during which both source and target base stations 103, 105 transmit data to the first user equipment 101. However, in contrast to soft handover operation, where identical transmissions are made from different base stations to be combined in the first user equipment 101, the operation of the system of FIG. 1 comprises the base stations 103, 105 making different transmissions to the first user equipment 101. Furthermore, in the system of FIG. 1, the transmissions from different base stations during the handover interval are orthogonal (in orthogonal resource allocations) and the first user equipment 101 receives the transmissions independently of each other.

Specifically, during the overlap period the radio resources are divided between the first and second base station 103, 105. Separation in time can be achieved by allocating different transmission intervals (such as different time slots) to the first and second base station 103, 105. Separation in the frequency domain can be achieved by allocating different carrier frequencies to the first and second base station 103, 105.

Typically, in a cellular communication system a certain amount of radio resource is allocated to a communication service. In the example, the radio resource allocation for the communication service is partitioned between the first and second base station 103, 105 during the handover interval. In this example, no additional radio resource is required to support the shared transmission handover mode.

For example, in a low complexity embodiment wherein the communication service is allocated one time slot in each time frame, the time slot allocated to the communicated service may be alternatively allocated to the first base station 103 in even time frames and to the second base station 105 in odd time frames.

In many embodiments, it may furthermore be advantageous to modify the partitioning during the handover interval. Specifically, the partitioning can be modified such that it is gradually changed from being biased towards the first base station 103 to being biased towards the second base station 105. For example, where individual time slots in different time frames are allocated to either the first or a second base station 103, 105 the ratio between time slots allocated to the first base station 103 and time slots allocated to the second base station 105 can be changed from substantially higher than one at the beginning of the handover interval to being substantially lower than one at the end of the handover interval. This will allow resource to be allocated to the base stations in a way that reflects the most likely requirement for the resource.

In the system of FIG. 1 the base stations use a retransmission scheme wherein data packets that have not been correctly received are retransmitted from the base stations at a later time.

In the example, the first base station 101 continues to support retransmissions of the data packets which have previously been transmitted by the first base station 101 during the handover interval and in the shared transmission mode. At the same time, the second base station 103 proceeds to transmit new data packets which have not previously been transmitted by the first base station 103.

Thus, in the system of FIG. 1 a handover mode of operation is initiated wherein the source base station (i.e. the first base station 103) continues to support retransmissions of old data packets whereas the target base station (i.e. the second base station 105) is responsible for transmitting the new data packets.

Figure 3:
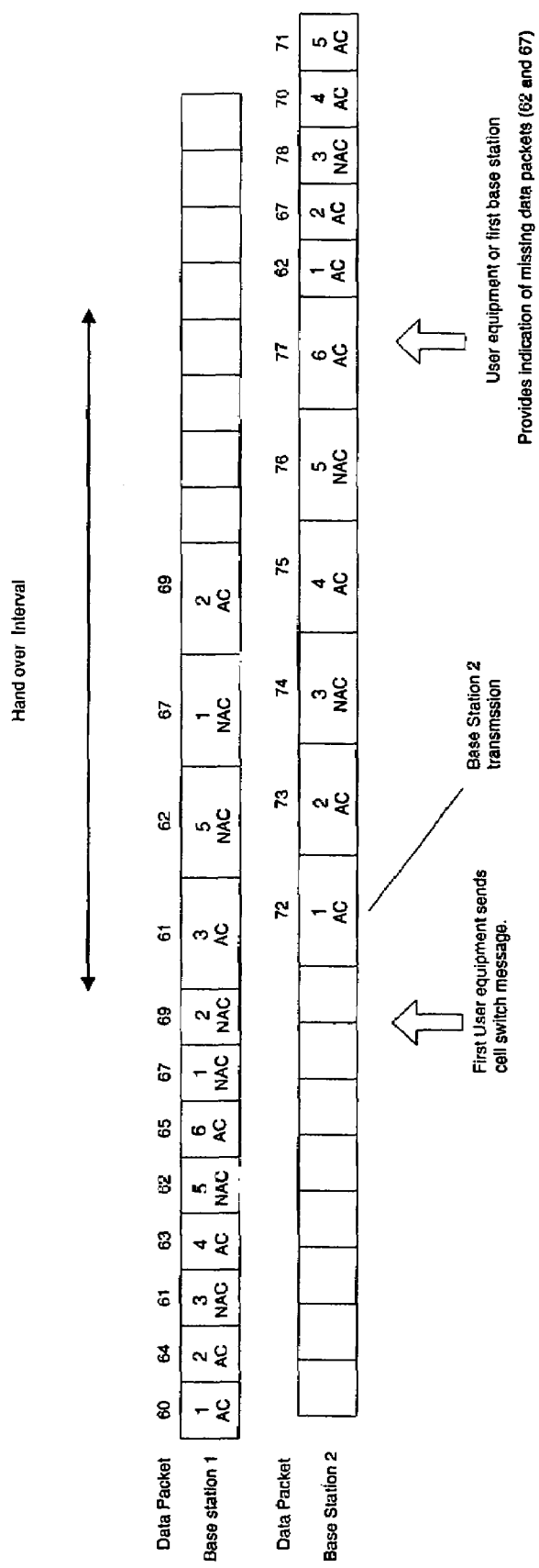
FIG. 3 illustrates an example of a hard handover in accordance with some embodiments of the invention.

It will be appreciated that this partitioning of responsibility need not be applied throughout the handover interval but may be initiated following a given activation time within the handover interval. The activation time may for example be determined by signalling between the base stations 103, 105 e.g. using the first user equipment 101 as a controlling element FIG. 3 illustrates an example of a hard handover in accordance with some embodiments of the invention. The Figure illustrates an example of a handover for a delay sensitive service and thus the example reflects the second mode of handover wherein a shared transmission mode is employed during a handover interval.

In the example the first base station 101 initially transmits data packets to the first user equipment 101. In FIG. 3 the data packet number is indicated by a number above the data packet. Thus the first base station transmits data packet 60 followed by data packet 64 etc. Furthermore, each data packet is assigned a retransmission identity number indicated within the data packet. Thus data packet 60 is transmitted using retransmission identity number 1.

At some point, in the example during the transmission of data packet 69, the first user equipment 101 determines that a cell switch is required and it transmits a cell switch message to the first and second base station 103 105. This cell switch message comprises the identity of the cell to which the hard handover should occur, i.e. it comprises the identity of the second base station 105. In addition, the cell switch message comprises an indication of the data packet number from which the second base station can begin transmission. In the example, the cell switch message indicates that the second base station 105 can begin to transmit data packets from number 72. As the communication service is a delay sensitive service, the data packets have already been downloaded to both the first base station 103 and a second base station 105 by the handover controller 205. Accordingly, the second base station 105 can initiate transmission of the data packet shortly after the first cell switch message is received.

In response to receiving the cell switch message, both the first and second base station 103, 105 enters a handover mode of operation for a certain handover interval. During this handover interval, the available allocated resource for the service is divided between the first base station and the second base station 103 105. This is shown in FIG. 3 by the data packets having a duration twice as long during the handover interval as before and after the handover interval indicating that it takes twice as long to transmit a given data amount.

During the handover interval the first base station 103 proceeds to make retransmissions of earlier transmitted data packets for which successful receipts of the data packet have not been received from the first user equipment 101 (i.e. a NACK message or no feedback message has been received).

Thus, in the example data packets 61, 62, 67 and 69 have not been successfully received. Therefore the first base station 103 proceeds to first transmit data packet 61 followed by 62, 67 and 69 during the handover interval. However, the first base station 103 does not proceed to transmit any new data packets which have not already been transmitted once by the first base station 103.

Furthermore, the second base station 105 also enters a handover mode and begins transmitting data packets to the first user equipment 101. These data packets are transmitted using an orthogonal resource allocation to the transmissions from the first base station 103, for example by using different time slots and/or different frequency carriers.

The second base station 105 starts transmitting using only half the total resource. Thus, as indicated in FIG. 3, the initial transmission of data packet takes twice as long for a given data packet size. The second base station starts transmitting from the data packet number indicated in the cell switch message. Thus, the second base station 105 starts transmitting data packet 72 followed by. data packet 73, etc. The second base station 105 furthermore operates its own retransmission scheme to ensure that the data packets which are transmitted are successfully received by the first user equipment 101.

At the end of the handover interval, the first user equipment 101 or the first base station 103 signals the second base station 105 to provide an indication of data packets which have not yet been acknowledged by the first user equipment 101. The second base station 105 then proceeds with retransmissions of the missing data packets.

In the example of FIG. 3, the second base station 105 thus transmits data packet 62 and 67. The second base station 105 also transmits any other data packets that have not yet been transmitted by either base station, packets 70 and 71 in the example. Furthermore, at the end of the handover interval the first base station terminates or has already terminated transmission to the first user equipment 101. Accordingly, the second base station 105 proceeds to exit the handover mode and reverts to normal operation wherein the full allocated resource for the communication service is used. Thus, following the handover interval, the communication service is fully supported by only the second base station.

It will be appreciated that in some embodiments the second base station can determine a suitable data packet from which to initiate transmission based on the retransmission feedback messages transmitted from the first user equipment 101 to the first base station 103. For example, in FIG. 3, the second base station 105 can detect that the first user equipment 101 has transmitted a NACK message for data packet 69 shortly before receiving the cell switch message. The second base station 105 can then determine a suitable data packet number from which to start, such as data packet 72, by adding a suitable margin of data packets reflecting the number of data packets that typically remain in the retransmission system.

In some embodiments, the first user equipment 101 can be arranged to monitor the operation during the handover interval to detect if a handover error has occurred. For example, the first user equipment 101 can monitor if the first base station 103 does not limit its transmission to only retransmissions of previously transmitted data packets or to the partitioned resource slots. Similarly, the first user equipment 101 can monitor if the second base station 105 does not begin to transmit data packets or if it does not transmit these data packet in the appropriate resource allocation for the handover interval. In such a case, the first user equipment 101 can determine that a handover error has occurred and can take remedial action.

In the case where the indication service is a non-delay sensitive service, the handover controller 205 will decide whether to forward each data packet to either the first base station 103 or to the second base station 105. Specifically, a handover switch time can be determined for this switchover such that any data packet received before the handover switch time is forwarded to the first base station 103 and any data packet received after this handover switch time is forwarded to the second base station 105. It will be appreciated that the handover switch time can be indicated in any suitable way, such as for example by an explicit data packet number from which all subsequent data packets are to be forwarded to the second base station 105.

In such an embodiment the handover switch time used by the handover controller 205 can be different than the air interface switch time at which the first user equipment 101 changes from being supported by the first base station 103 to be supported by the second base station 105 over the air interface.

For example, a handover controller 205 can determine a handover switch time after which all data packets are transmitted to the second base station 105. However, the first user equipment 101 can continue to be supported by the first base station 103 for a certain time interval in order to allow the first base station 103 to complete retransmissions of data packets which have already been transmitted from the first base station 103 (and which have not been forwarded to the second base station 105). At the end of this interval, any remaining non-acknowledged data packet will be forwarded to the second base station 105 for transmission to the first user equipment 101.

The determination of the handover switch time can for example be determined depending on signalling from the first user equipment 101. Specifically, the first user equipment 101 may transmit a cell switch message which comprises an indication of the last received data packet and this can be forwarded to the handover controller 205 which in response determines a suitable data packet from which to forward data to the second base station 105.

Specifically, the handover controller 205 can proceed to forward all data packets received after the cell switch message has been received to the second base station 105 rather than to the first base station 101.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion in a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A cellular communication system including at least a first base station and a second base station, at least a first user equipment, and an apparatus for controlling a hard handover of the first user equipment between the first base station and the second base station, the apparatus comprising:

means for determining a Quality of Service (QoS) characteristic for a communication of the first user equipment, and forwarding means for forwarding data of the communication to at least one of the first base station and the second base station in response to the QoS characteristic, wherein the first and second base stations are arranged to operate in a shared data transmission mode during a handover interval if data is forwarded to both the first base station and the second base station, the shared data transmission mode comprising data packets being transmitted to the first user equipment from both the first and the second base station.

2. The cellular communication system of claim 1 wherein the forwarding means is arranged to forward the data to both the first base station and the second base station if the QoS characteristic is indicative of the communication having a delay constraint meeting a criterion and to forward the data to only one of the first base station and the second base station if the QoS characteristic is indicative of the communication not having a delay constraint meeting the criterion.

3. The cellular communication system of claim 2 wherein the forwarding means is arranged to forward the data to both the first base station and the second base station if the QoS characteristic is indicative of the communication supporting a real-time service and to forward the data to only one of the first base station and the second base station if the QoS characteristic is indicative of the communication supporting a non-real-time service.

4. The cellular communication system of claim 1 further comprising partitioning means for partitioning a total resource allocation for the communication between the first base station and the second base station during the handover interval.

5. The cellular communication system of claim 1 wherein the partitioning means is arranged to modify the partitioning during the handover interval.

6. The cellular communication system of claim 1 wherein the first and second base stations are arranged to transmit data to the first user equipment in orthogonal resource allocations during the handover interval.

7. The cellular communication system of claim 6 wherein the orthogonal resource allocations are orthogonal in the time domain.

8. The cellular communication system of claim 6 wherein the orthogonal resource allocations are orthogonal in the frequency domain.

9. The cellular communication system of claim 1 wherein the communication is supported by a retransmission scheme and wherein during the handover interval the first base station is arranged to support retransmissions of data packets previously transmitted by the first base station.

10. The cellular communication system of claim 1 wherein the communication is supported by a retransmission scheme and wherein during the handover interval the second base station is arranged to transmit data packets not previously transmitted by the first base station.

11. The cellular communication system of claim 1 wherein the second base station is arranged to receive an indication from the first user equipment of a data packet of the communication from which to start transmitting.

12. The cellular communication system of claim 11 wherein the indication is received in retransmission feedback messages from the first user equipment to the first base station.

13. The cellular communication system of claim 1 wherein the second base station is arranged to receive a transmission indication indicative of a number of data packets not successfully transmitted by the first base station at the end of the handover interval.

14. The cellular communication system of claim 1 wherein the first user equipment comprises monitoring means for monitoring an operating characteristic during the handover interval; and error detection means for detecting an error in response to an inconsistency between the monitored operating characteristic and the shared data transmission mode.

15. The cellular communication system of claim 1 wherein if the shared data is forwarded to only one of the first base station and the second base station, the data forwarding means is arranged to forward data to the first base station until a handover switch time and is arranged to forward data to the second base station after the handover switch time.

16. The cellular communication system of claim 15 wherein the first base station is arranged to support a retransmission scheme for previously transmitted data packets after the handover switch time.

17. The cellular communication system of claim 15 wherein the data forwarding means are arranged to determine the handover switch time in response to cell change signalling from the first user equipment.

18. The cellular communication system of claim 1 wherein the first base station comprises the apparatus for controlling the hard handover.

19. An apparatus for controlling a hard handover of a first user equipment between a first base station and a second base station, the apparatus comprising:
  means for determining a Quality of Service (QoS) characteristic for a communication of the first user equipment, and
  means for forwarding data of the communication to at least one of the first base station and the second base station in response to the QoS characteristic, wherein the first and second base stations are arranged to operate in a shared data transmission mode during a handover interval if data is forwarded to both the first base station and the second base station, the shared data transmission mode comprising data packets being transmitted to the first user equipment from both the first and the second base station.

20. A method of controlling a hard handover of a first user equipment between a first base station and a second base station of a cellular communication system, the method comprising:
  determining a Quality of Service (QoS) characteristic for a communication of the first user equipment, and
  forwarding data of the communication to at least one of the first base station and the second base station in response to the QoS characteristic, wherein the first and second base stations operating in a shared data transmission mode during a handover interval if data is forwarded to both the first base station and the second base station, the shared data transmission mode comprising data packets being transmitted to the first user equipment from both the first and the second base station.

* * * * *